May 22, 1951 — L. J. HIBBARD — 2,554,248
DEPHASED INDUCTIVE-INTERFERENCE PREVENTION
Filed Jan. 25, 1950

WITNESSES:
Edward Michaels
Rev. C. Groove

INVENTOR
Lloyd J. Hibbard.
BY G. B. Buchanan
ATTORNEY

Patented May 22, 1951

2,554,248

UNITED STATES PATENT OFFICE 2,554,248

DEPHASED INDUCTIVE-INTERFERENCE PREVENTION

Lloyd J. Hibbard, Pittsburgh, Pa., assignor to Westinghouse Electric Corporation, East Pittsburgh, Pa., a corporation of Pennsylvania Application January 25, 1950, Serial No. 140,475

20 Claims. (Cl. 171—97)

My invention relates to installations of a plurality of rectifier power-units or other alternating-current power-units of a type producing line-current harmonics which are a source of inductive interference in telephone lines which are inductively coupled to the power-line. My invention has more particular relation to means for causing a plurality of such units to operate with particular values of small phase-angles between the line-frequency components of the line-currents of the various units, these phase-angles having particular values which are calculated to cancel out the resultant line-current harmonics at a harmonic-order or frequency at which the telephone-interference noise is the greatest.

An object of my invention is to adjust the impedances, or other power-factor-controlling means, of a plurality of M simultaneously operating interference-producing units, so that successive units have fundamental-frequency line-currents which are out of phase with each other by a small angle approximating 0.356° $f/M$, or, in general 360° $f/(Mf_1)$, where $f$ is the fundamental line-frequency, and $f_1$ is the frequency of the harmonic which would produce the most inductive-interference noise, if not checked.

My invention is an improvement upon the inductive-interference preventive-means which constitutes the subject of my application Serial No. 120,331, filed October 8, 1949, on rectifier-powered traction-units for self-propelled vehicles, and other rectifier-applications.

Figure 1:
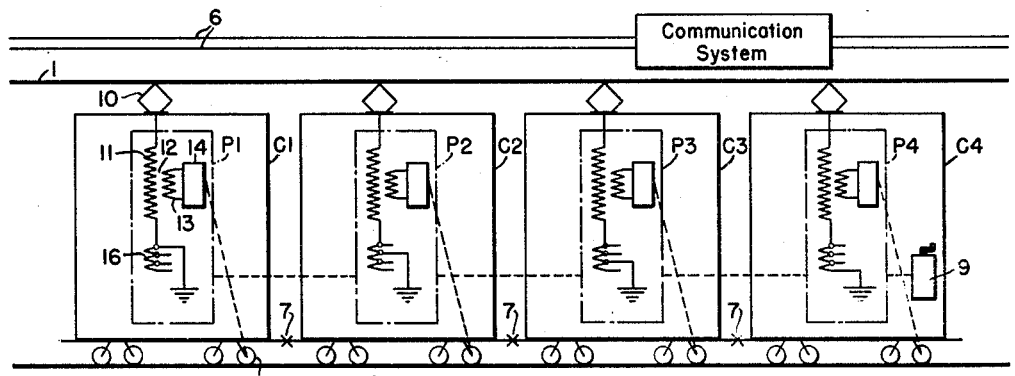
Figure 2:
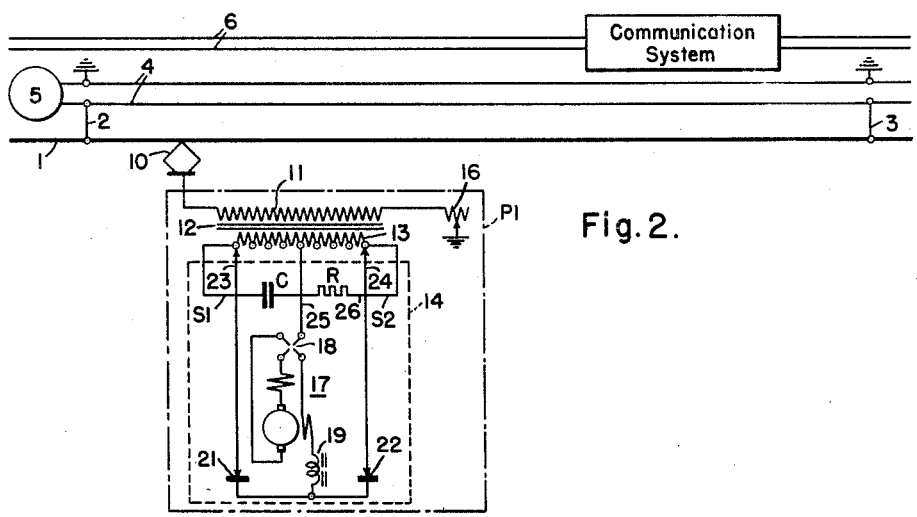
Figure 3:
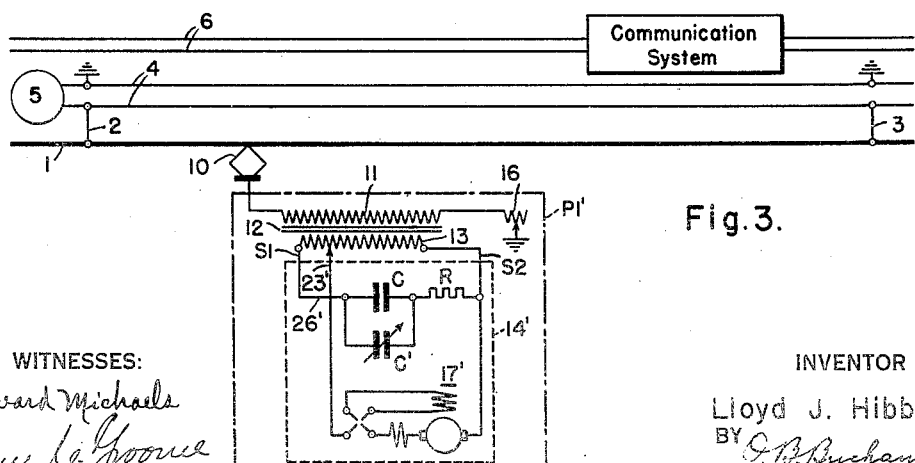

Exemplary forms of embodiment of my invention are shown in the accompanying drawing, wherein Fig. 1 is a diagrammatic view of circuits and apparatus indicating the application of my invention to a plurality of coupled railway-cars or locomotives, operating from an A.-C. trolley, and having interference-producing driving-units under the control of a single controller, and Figs. 2 and 3 are diagrammatic detailed views of an individual power-unit, Fig. 2 showing a rectifier-powered car using one or more direct-current traction-motors, while Fig. 3 shows a self-propelled railway-vehicle which is driven by one or more single-phase series commutator-motors.

Although my invention is not limited to railway circuits, an important field of application of the invention is in such service. In the drawing, I have indicated a typical railway installation in which a high-voltage single-phase trolley is indicated at 1. Single-phase power is supplied to the trolley 1, at various spaced points, such as 2 and 3, from an A.-C. feeder 4 which is supplied with energy from a source or alternator 5, as shown in Figs. 2 and 3. In order to indicate an inductive-interference or telephone-interference problem, I have included, in each figure, a diagrammatic representation of a telephone-system or communication-system 6, which is in proximity to the feeder 4, or the trolley 1, or both.

In the application of my invention, there must be two or more power-units such as P1, P2, P3 and P4, each of which is a source of line-current harmonics which tend to produce telephone-interference. These units may be mounted on the same vehicle, or on a plurality of different cars or locomotives, such as are diagrammatically indicated in Fig. 1 at C1, C2, C3 and C4. These individual cars or locomotives may be separate independent vehicles, or they may be coupled together, by couplings 7, as diagrammatically indicated in Fig. 1, in which case they are preferably under the control of a single controller 9.

The individual power-units may be of any type which acts as a source of line-current harmonics of a magnitude and frequency-range such as to produce objectionable inductive interference or noise in the communication-system 6. Two different illustrative types of such interference-causing power-units are indicated in Figs. 2 and 3, at P1 and P1', respectively.

In each cause, as shown by all of the figures of the drawing, single-phase power is supplied to each power-unit by means of a pantograph 10, which makes contact with the trolley 1, and which energizes the primary winding 11 of a power-transformer 12 having a secondary winding 13 which energizes a motive-power unit 14 which drives one or more of the vehicle-wheels 15.

In each case, in accordance with my invention, some suitable power-factor controlling-means is used. Such means may take the form of a variable inductor 16 connected in series with the primary winding 11, as shown in all of the figures, or it could be a variable capacitor C', as indicated in Fig. 3; or other known power-factor adjusting means could be used, such as anode-reactors, or delayed firing by grid-control.

In Fig. 2, I have indicated that the power-units, such as P1, include a motive-power unit 14 of a type using one or more rectifier-powered series direct-current traction-motors 17 having a reversing-switch 18, and usually also having a serially connected ripple-reducing choke-coil 19. The motor or motors 17 are supplied with direct-current power through rectifiers 21 and 22, which are energized from tapped points 23 and 24 on the secondary winding 13 of the transformer 12. The motor has a return-circuit 25 which goes to the midpoint of the secondary 13. As described in my copending application, this equipment can be used with, or without, a noise-reducing filter. If such a filter is used, it may be connected either across the anode-leads 23 and 24 of the rectifiers, or across other fixed or variable points of the transformer 13, such as the two secondary terminals S1 and S2 of the transformer. Such a filter-circuit is indicated, at 26 in Fig. 2, as comprising a capacitor C and a serially connected damping-resistance R.

In Fig. 3, I have indicated that the power-units, such as P1', are of a different type, having a motive-power unit 14' which comprises one or more series single-phase traction-motors 17', which are energized from a variable-voltage tap 23' on the secondary winding 13 of the transformer 12. Here again, the motive-power unit 14' may, or may not, be provided with a filter-circuit 26' which consists of the capacitor C and the damping resistance R. In Fig. 3, the capacitor C is indicated as being shunted by a small adustable vernier-capacitor C', which can serve as a means for adjusting the line-current power-factor.

As explained in my copending application, the total telephone-interference noise is the summation of all the noises due to all of the line-current frequencies or harmonics, including the fundamental as a first-order harmonic. The magnitude I of each harmonic is multiplied by the telephone-line coupling-factor, and by a weighting-factor T which represents the seriousness of the noise-level produced at the frequency of that harmonic, taking into account such factors as coupling, instrument-sensitivity, and human-ear sensitivity, at the various frequencies. An approximation of the weighting-factor values T, for different frequencies, was published by Barstow et al. in 1935 A. I. E. E., at page 1312, Fig. 6. In a more modern version of this telephone-interference weighting-curve, which is sometimes used, the weighting-factor starts at unity at frequencies of 60 cycles and lower, the presupposed telephone-interference coupling-condition being so chosen that this is so. The weighting-factor reaches $T=2.7$ at 100 cycles, $T=7.6$ at 150 cycles, $T=1000$ at 500 cycles, and rapidly increases up to a maximum of $T=12,100$ at 1070 cycles, after which the weighting-factor T reduces more slowly, to a value of $T=500$ at 4615 cycles, with a slight hump from $T=3500$ to $T=3930$ and back again to $T=3500$ at frequencies of 1950, 2950 and 3350 cycles, respectively. The weighting-curve T becomes negligibly small at frequencies above about 4620 cycles, but frequently the small magnitudes of the harmonics, multiplied by the small values of the weighting-factor T, make the telephone - interference noise - level negligibly small, long before such frequencies are reached. The total amount of telephone-interference is indicated by the ratio of the sum of the squares of the noise-level quantities for the different frequencies, divided by the R. M. S. value of the current; or the overall noise-level may also be measured by means of instruments which are available.

In accordance with my invention, it is not always necessary to use filters for reducing the inductive-interference noise, although such filters may also be used with my present invention, but if they are used, they do not always need to be exactly adjusted for the precise amounts of capacitance C and damping resistance R which are necessary for the optimum noise-prevention in an individual power-unit. When used with my invention, such filters may be adjusted to reduce the noise-level for all harmonics except a single narrow range of harmonics, and this narrow range of harmonics can then be nullified by the dephasing means of my present invention. For example, the filter-capacity C may be made somewhat smaller than would normally be used for an interference-producing power-unit which was designed solely for individual operation, and also smaller amounts of damping-resistance R could be used, so as to produce a peak in the harmonic-magnitudes I of individual power-units in a frequency-region where the interference-noise-factor T is quite high, and then that particular frequency-range can be nullified by my present dephasing-means. It will be understood, of course, that the filter-capacitor C is in resonance with the combined inductance of the transformer 12 and the line 1—4—5 at some particular resonance-frequency $f_0$, and at this resonance-frequency the filter has a tendency to somewhat amplify the line-current harmonics, instead of reducing them.

My present invention is based upon the well-known fact that an angle $\phi$ which is introduced in the fundamental-frequency line-current of a harmonic-generating apparatus will introduce a phase-angle displacement of $N\phi$ in the Nth harmonic. Thus, if there are two simultaneously operating harmonic-generating units, each having an Nth-harmonic current of the magnitude I, the two currents can be made to cancel out each other by giving them a 180° phase-displacement between each other, making $$N\phi = 180° \qquad (1)$$

This Nth harmonic has a frequency of $Nf$ cycles, where $f$ is the line-frequency or fundamental frequency. This harmonic phase-displacement $N\phi$ between the two assumed harmonic-currents I can be chosen so that, at a harmonic frequency $Nf$ corresponding to a harmonic-frequency at which the noise-level is close to a maximum, the phase-displacement $N\phi$ between the two harmonic-currents, I, can be made to approximate 180°. Or, in general, if there are more than two simultaneously operating harmonic-generating units having Nth harmonics of the magnitude I—for example, if there are M such units—the phase-angle between the Nth harmonics of successive units should be made to equal $$N\phi = \frac{360°}{M} \qquad (2)$$

It is not necessary that the harmonic phase-difference $N\phi$ should be precisely $360°/M$. For example, where $M=2$, the resultant of the two vectorially added quantities $\bar{I}$, which lack $\theta$ degrees of being in exact phase-opposition, that is, having a phase-angle $N\phi = (180° - \theta)$ between them is equal to $$S_2 = 2I \sin \frac{\theta}{2} \qquad (3)$$

When $M=3$, the vector-sum of three equal vectors $\bar{I}$, with the two outer vectors displaced from the middle vector by the phase-angle $(120° - \theta)$ in the leading and lagging directions, respectively, is $$S_3 = I[4 \sin^2 (30° + \theta/2) - 1] \qquad (3')$$

For larger values of M, the expressions for the total resultant harmonic current S become more complicated.

Thus, when there are two dephased units, or $M=2$, a phase-angle discrepancy of $\theta=5.8°$ produces a vector-sum of approximately $S=0.1I$, which is to be compared with the harmonic-current $2I$ which would be produced if the two harmonic-sources were in phase with each other. It would take a phase-angle discrepancy of $\theta=11.6°$ to produce a vector-sum of $S=0.2I$, and it would take an angle $\theta=17.2°$ to produce a vector-sum of the magnitude $S=0.3I$, etc.

Where there are more than two harmonic-producing units, that is, when $M$ is greater than 2, the system of $M$ harmonic-current vectors $I$ can be made to approximate a symmetrical polyphase system as expressed in Equation 2, and here again the vectors cancel each other out fairly well, in the vectorial sum, even though the phase-angle between successive vectors departs from the ideal symmetrical value of $360°/M$, as indicated in Equation 3' for a three-phase system.

If there are more than three harmonic-generating units, that is, if $M$ is greater than 3, then the units could be considered as consisting of two or more smaller groups, or they may be considered as a single group making an approximately symmetrical polyphase system at the harmonic-frequency which is to be eliminated. Thus, a 4-unit installation, as shown in Fig. 1, could be designed as a 4-phase system, having a phase-angle of $N\phi=90°$ between the Nth harmonic vectors $I$, or it could be operated as two 2-phase vector-systems having a phase-angle of $N\phi=180°$ between the two Nth-harmonic vectors $I$ in each group. In like manner, a 5-group installation could be considered as a 5-phase installation, with respect to the Nth harmonic, or it could be split up into a 2-phase system and a 3-phase system, each properly designed to eliminate the Nth harmonic.

Expressed mathematically, if the harmonic-frequency which produces the greatest inductive interference is indicated as $f_1$, we have the equation $$Nf = f_1 \qquad (4)$$

which, when combined with Equation 2, gives a fundamental-frequency line-current phase-angle displacement $\phi$, between successive units, as follows $$\phi = \frac{360f}{Mf_i} \qquad (5)$$

The power-factor or phase of the line-current drawn by any alternating-current power-unit usually varies in accordance with the load, and is usually shown by a power-factor or phase-angle curve, plotted against the load-current. If the impedance of the apparatus is changed, for example, if either the effective reactance or the effective resistance of the apparatus is changed, then another curve is obtained, which separates off from the first curve, as the current is increased from zero to its maximum value. In practicing my invention, I make use of the difference in phase-angle between two such curves, corresponding to different impedance-angles, choosing the phase-angle at the current-magnitude at which the inductive-interference problem is to be solved.

There are two principal factors which determine the telephone-interference noise-value in any individual power-apparatus which produces harmonics in the line-current. One of these factors is the manner in which the magnitude $I$ of the harmonic varies, as the harmonic-order increases from one, up to as high as it is necessary to go. (This relationship varies, in different apparatus, with the harmonic currents $I$, usually reducing down to a negligibly small value for harmonic-numbers of the order from about the 40th to the 70th.) The second noise-controlling factor is the telephone-interference weighting-value $T$, which reaches a maximum of $T=12,100$ at 1070 cycles. If each harmonic current $I$ of a single harmonic-generating power-unit is multiplied by its applicable weighting factor $T$, the noise-level product $IT$ is usually a maximum at practically the same frequency as the weighting-factor $T$.

My present invention introduces a third noise-controlling factor $S$, which is the vectorial sum of the system of polyphase vectors $I$ which make up the harmonic currents of any given order $N$. This vector-sum $S$ varies between 0 and $MI$, being zero each time the harmonic angle $N\phi$ is equal to 180° or an odd multiple thereof, and having its maximum value of $MI$ whenever the harmonic-angle $N\phi$ is equal to an even multiple of 180°.

In practicing my invention, the fundamental-frequency line-currents of a plurality of harmonic-generating power-units are adjusted so that each succeeding unit has a phase-angle $\phi$ between itself and the next unit in the series, with the angle $\phi$ being determined in accordance with Equation 5, or as close an approximation thereto as may be necessary. Where the maximum value of the interference-product $IT$ is fairly constant over a range of frequencies approximating $f_1$, the best value of the interference-producing frequency $f_1$, to be used in Equation 5, can be determined by assuming two or more values and running through the computations as above outlined, to determine which total noise-value is the lowest.

In some instances, there may be a secondary peak in the interference-product $IT$, at some value which is approximately three times, or even five times, one of the range of values which it is possible to assign to $f_1$, in which case it may be desirable to choose the eliminated frequency $f_1$ so as to be approximately one-third or one-fifth of the higher noise-producing frequency, as the case may be.

In general, I believe that the best results will usually be obtained by choosing an eliminated harmonic-frequency $f_1$ of somewhere around 1070 cycles, say 1010 cycles, or say between the limits of 800 cycles and 1340 cycles, or even wider limits, dependent somewhat upon the nature of the harmonic-distribution of the particular type of harmonic-generating unit which is under consideration. This would make the line-current phase-angle $\phi$ approximate the value $$\phi = 0.356°f/M$$

or between the limits of $0.27°f/M$ and $0.45°f/M$. For a 25-cycle line, this line-current phase-angle $\phi$ would approximate $8.91°/M$, or between the limits of $6.7°/M$ and $11.25°/M$. For a 60-cycle system, said line-current phase-angle $\phi$ would approximate something like $21.4°/M$, or between the limits of $16.1°/M$ and $27°/M$. For a 2-unit system, where $M$ equals 2, the optimum phase-angle $\phi$ between the line currents of the two units would be something of the order of $4.46°$, or between say $3.4°$ and $5.6°$, or even wider limits, if less perfect results are acceptable. For 60-cycle apparatus consisting of only two units, that is, with $M$ equal to 2, the optimum line-current phase-angle $\phi$ would usually lie around 10.7°, or say between the limits of 8.2° and 13.5°, or even wider limits.

It is obvious, of course, that any change in the phase-angle of the line-currents drawn by the respective power-units will produce a change in the resonant-frequency $f_0$ at which the filter is tuned. If L is the inductance of the supply-line and the transformer, expressed in terms of the secondary voltage, and C is the capacitance of the filter-capacitor, the resonant-frequency will be $$f_0 = 1/(2\pi\sqrt{LC}) \qquad (6)$$

The phase-angle of the harmonic, at any relatively high frequency $f_h$, higher than the resonance-frequency $f_0$, would be $$\theta_f = \tan^{-1}\left[-\frac{2\pi fL}{R}\left(1 - \frac{f_0^2}{f^2}\right)\right] \qquad (7)$$

At any harmonic-frequency $f_h$ which is not close to the resonant-frequency $f_0$, this filter-introduced phase-angle is quite close to −90°, and it does not change much with the small changes in the value of the ratio $f/f_0$. Hence, any change in tuning, or any change in the resonance-frequency $f_0$, which might be caused by the means which are used to produce the phase-difference $\phi$ between the line-currents of the respective units, would not appreciably affect the value of the phase-angle $\theta_f$ between the Nth harmonics of a plurality of power-units.

It is obvious, also, that when the filter-capacitor C is used, a relatively small change in the inductance L will produce the necessary change in the line-current phase-angle $\phi$ because the filter causes the unit to operate fairly close to unity power factor.

My invention is advantageously used in installations in which a plurality of interference-producing units are controlled simultaneously, as by the use of a common controller 9, as diagrammatically indicated in Fig. 1. When this is the case, the values of the several phase-controlling means, such as the primary-circuit inductors 16 (to give one example), can be suitably adjusted, for the different units, so as to control their relative phase-angle $\phi$ in the manner previously explained. However, the two or more harmonic-generating units which produce the telephone-interference in the power-line do not need to be at the same place, provided that they are not too far away from each other in comparison with the length of inductive-interference exposure between the power-system and the nearby communication system 6. In such cases, the total overall inductive interference, resulting from all such units which may be in operation in any neighborhood, may be very considerably reduced by treating the independent units as if they were groups of two or three or more, in accordance with my present invention, and making some of the units have a relative phase-angle $\phi$ with respect to others, in accordance with the principles already described. In such cases, multiple-unit control 9 would not be used, of course.

It will be understood that my invention is susceptible of some variations as to the accuracy of the approximations to the optimum phase-angle values $\phi$ which are used in any case. In general, any sort of phase-angle variation $\phi$, of one unit with respect to another, will prove useful in reducing inductive-interference telephone-noise, provided that the angle $\phi$ is made a small angle within the orders of magnitude which have been previously mentioned. It will also be understood that I am not limited to the precise forms of embodiment which have been shown, as various changes can be made, by way of additions, omissions and the substitution of equivalents and less exact approximations, without departing from the essential spirit of my invention. I desire, therefore, that the appended claims shall be given the broadest construction consistent with their language.

I claim as my invention:

1. The combination with an $f$-frequency alternating-current power-line and an inductively coupled telephone-line adjacent thereto, of a plurality of M simultaneously operable alternating-current power-units of a type having line-currents which are of similar magnitudes, and which include line-current harmonics of frequencies which would be a source of inductive interference in said telephone-line, means for connecting said power-units to said power-line, and means for causing the line-currents of successive power-units to have a phase-angle displacement $\phi$ which will approximately produce a minimum sum of the squares of the noise-level quantities for the different frequencies, each noise-level quantity being the product of the magnitude I of that harmonic, times the telephone-line coupling-factor, times the weighting factor T which represents the seriousness of the noise-level at that frequency, times a factor $S/I$ representing the vector-sum of the M-phase system of harmonic-current vectors having a phase-displacement of $N\phi$ between them, where N is the order of the harmonic.

2. The invention as defined in claim 1, in combination with means for simultaneously controlling all M of said power units.

3. The invention as defined in claim 1, characterized by said power-line including a single-phase trolley, and said M power-units including motive-power means for a self-propelled railway-vehicle or vehicles.

4. The invention as defined in claim 1, characterized by said M power-units including rectifiers.

5. The invention as defined in claim 1, characterized by said power-line including a single-phase trolley, and said M power-units being rectifier-powered direct-current railway traction-motor units.

6. The combination with an $f$-frequency alternating-current power-line and an inductively coupled telephone-line adjacent thereto, of a plurality of M simultaneously operable alternating-current power-units of a type having line-currents which are of similar magnitudes, and which include line-current harmonics of frequencies which would be a source of inductive interference in said telephone-line, means for connecting said power-units to said power-line, and means for causing the line-currents of successive power-units to have a phase-angle displacement $\phi$ which will cause an approximately zero vector-sum of the M-phase system of harmonic-current vectors at a frequency $Nf$ approximately 1070 cycles per second, with a phase-displacement of $N\phi$ between said vectors.

7. The invention as defined in claim 6, in combination with means for simultaneously controlling all M of said power-units.

8. The invention as defined in claim 6, characterized by said power-line including a single-phase trolley, and said M power-units including motive-power means for a self-propelled railway-vehicle or vehicles.

9. The invention as defined in claim 6, characterized by said M power-units including rectifiers.

10. The invention as defined in claim 6, characterized by said power-line including a single-phase trolley, and said M power-units being rectifier-powered direct-current railway traction-motor units.

11. The combination with an $f$-frequency alternating-current power-line and an inductively coupled telephone-line adjacent thereto, of a plurality of M simultaneously operable alternating-current power-units of a type having line-currents which are of similar magnitudes, and which include line-current harmonics of frequencies which would be a source of inductive interference in said telephone-line, means for connecting said power-units to said power-line, and means for causing the line-currents of successive power-units to have a phase-angle displacement approximating an optimum value of about $0.356°f/M$.

12. The invention as defined in claim 11, in combination with means for simultaneously controlling all M of said power-units.

13. The invention as defined in claim 11, characterized by said power-line including a single-phase trolley, and said M power-units including motive-power means for a self-propelled railway-vehicle or vehicles.

14. The invention as defined in claim 11, characterized by said M power-units including rectifiers.

15. The invention as defined in claim 11, characterized by said power-line including a single-phase trolley, and said M power-units being rectifier-powered direct-current railway traction-motor units.

16. The combination with an $f$-frequency alternating-current power-line and an inductively coupled telephone-line adjacent thereto, of a plurality of M simultaneously operable alternating-current power-units of a type having line-currents which are of similar magnitudes, and which include line-current harmonics of frequencies which would be a source of inductive interference in said telephone-line, means for connecting said power-units to said power-line, and means for causing the line-currents of successive power-units to have a phase-angle displacement between the limits of approximately $0.27°f/M$ and $0.45°f/M$.

17. The invention as defined in claim 16, in combination with means for simultaneously controlling all M of said power-units.

18. The invention as defined in claim 16, characterized by said power-line including a single-phase trolley, and said M power-units including motive-power means for a self-propelled railway-vehicle or vehicles.

19. The invention as defined in claim 16, characterized by said M power-units including rectifiers.

20. The invention as defined in claim 16, characterized by said power-line including a single-phase trolley, and said M power-units being rectifier-powered direct-current railway traction-motor units.

LLOYD J. HIBBARD.

No references cited.